United States Patent
Elliott et al.

[11] Patent Number: 5,880,983
[45] Date of Patent: Mar. 9, 1999

[54] FLOATING POINT SPLIT MULTIPLY/ADD SYSTEM WHICH HAS INFINITE PRECISION

[75] Inventors: Timothy Alan Elliott, Austin; Robert Thaddeus Golla, Plano; Christopher Hans Olson; Terence Matthew Potter, both of Austin, all of Tex.

[73] Assignee: International Business Machines Corporation, Armonk, N.Y.

[21] Appl. No.: 620,733

[22] Filed: Mar. 25, 1996

[51] Int. Cl.⁶ .................................................. G06F 7/38
[52] U.S. Cl. .................................................. 364/748.07
[58] Field of Search ..................... 364/748.09, 748.07, 364/748.02

[56] References Cited

U.S. PATENT DOCUMENTS

| | | |
|---|---|---|
| 3,919,535 | 11/1975 | Vattuone . |
| 4,075,704 | 2/1978 | O'Leary . |
| 4,488,252 | 12/1984 | Vassar . |
| 4,660,143 | 4/1987 | King et al. ............................. 364/200 |
| 4,683,547 | 7/1987 | DeGroot . |
| 4,866,651 | 9/1989 | Bleher et al. ........................... 364/748 |
| 4,926,370 | 5/1990 | Brown et al. ........................... 364/748 |
| 4,943,940 | 7/1990 | New . |
| 4,945,505 | 7/1990 | Wiener et al. ........................ 364/715.03 |
| 4,969,118 | 11/1990 | Montoye et al. . |
| 4,999,802 | 3/1991 | Cocanougher et al. . |
| 4,999,803 | 3/1991 | Turrine et al. . |
| 5,202,972 | 4/1993 | Gusefski et al. ........................ 395/425 |
| 5,241,493 | 8/1993 | Chu et al. ............................... 364/748 |
| 5,253,195 | 10/1993 | Broker et al. ........................... 364/759 |
| 5,257,215 | 10/1993 | Poon ...................................... 364/745 |
| 5,311,458 | 5/1994 | Haines et al. . |
| 5,333,287 | 7/1994 | Buerkle et al. ......................... 395/375 |
| 5,341,319 | 8/1994 | Madden et al. ........................ 364/748 |
| 5,341,321 | 8/1994 | Karp et al. .............................. 364/748 |
| 5,369,607 | 11/1994 | Okamoto ................................ 364/748 |
| 5,375,078 | 12/1994 | Hrusecky et al. ................... 364/748.07 |
| 5,530,663 | 6/1996 | Garcia et al. ....................... 364/748.07 |

FOREIGN PATENT DOCUMENTS

| | | |
|---|---|---|
| 596175A | 11/1992 | European Pat. Off. . |
| 645699A | 9/1993 | European Pat. Off. . |
| 3218518 | 9/1991 | Japan . |

OTHER PUBLICATIONS

IBM Technical Disclosure Bulletin, "Floating Point Feature On The IBM Type 1620", Jones, F.B. and Wymore, A.W., vol. 4, No. 12, May 1962.

IBM Technical Disclosure Bulletin, "High–Speed Floating–Point Accumulator", Sproul, W., vol. 4, No. 10, Mar. 1972.

IBM Technical Disclosure Bulletin, "Floating Point Exception Handling (Denormalization)", vol. 33, No. 9, Feb. 1991.

(List continued on next page.)

*Primary Examiner*—Tan V. Mai
*Attorney, Agent, or Firm*—Sawyer & Associates; Casimer K. Salys

[57] ABSTRACT

A method and system for an infinite precision split multiply and add operation which has increased speed. The method and system for providing a split multiply and add of a plurality of operands include a multiplier and an adder means. The multiplier multiplies a first portion of the plurality of operands, thereby providing a product. The adder, which combines the remaining operands and the product, comprise at least one pair of data paths. Each pair of data paths comprises a first data path and a second data path. The first data path comprises a first aligner, a first adder, and a first normalizer capable of shifting a mantissa by a substantially fewer number digits than the aligner. The second data path comprises a second aligner, a second adder, and a second normalizer capable of shifting a mantissa by a substantially larger number of digits than the aligner. Accordingly, the present invention includes split multiply and add data paths which, individually, are faster than a fused multiply and add. In addition, the split multiply and add data paths can preserve the appearance of infinite precision. Consequently, overall system performance is increased.

42 Claims, 4 Drawing Sheets

FIG. 2A    FIG. 2B

OTHER PUBLICATIONS

IBM Technical Disclosure Bulletin, "Single Cycle/Writeback Cycle Floating Point Denormalizationr", vol. 37, No. 04B, Apr. 1994.

IBM Technical Disclosure Bulletin, "Floating Point Convert to Integer Improved Implementation", vol. 37, No. 07, Jul. 1994.

IBM Technical Disclosure Bulletin, "Floating Point Bypass Dataflow", vol. 37, No. 09, Sep. 1994.

Saunders, D.M. and Watkins, G.J., High–Speed Multiplier, Jul. 1970, vol. 13 No. 2, pp. 546–548, IBM Technical Disclosure Bulletin.

IBM Technical Disclosure Bulletin, Floating Point Multiply Split, Dec. 1991, vol. 34 No. 7B, pp. 207–211.

IBM Technical Disclosure Bulletin, Floating Point 2:1 High Level Design, Dec. 1991, vol. 34 No. 7B, pp. 283–285.

FLOATING POINT SPLIT MULTIPLY/ADD SYSTEM WHICH HAS INFINITE PRECISION

FIELD OF THE INVENTION

The present invention relates to mathematical operations on floating point numbers, and more particularly to a method and system for a fast split multiply/add operation which has infinite precision.

BACKGROUND OF THE INVENTION

Floating point numbers are comprised of a digit and a decimal point followed by a certain number of significant digits, for example 52, multiplied by 2 to a power. For example, a floating point number can be expressed as $(1.10110 \ldots)*(2^x)$. Consequently, floating point numbers are represented by a mantissa and an exponent. A mantissa is the digit and binary point followed by the significant digits. Therefore, the mantissa typically has a total of 53 significant digits. The exponent is the power to which 2 is taken.

Mathematical operations on floating point numbers can be carried out by a computer. One such operation is the multiply/add operation. The multiply/add operation calculates Ra*Rc+Rb, where Ra, Rb, and Rc are floating point operands. Typical split multiply/adds carry out the operation Ra*Rc first, thereby providing an intermediate product, Rm. After Rm is calculated and rounded, the sum Rm+Rb is calculated. In order to perform these operations in a timely manner, conventional processors round Rm. This can introduce error into the calculations. Typical floating point adds also require two wide shifters to align the mantissas prior to addition and to normalize the final result. Wide shifters cause significant delays in data flows. Thus, conventional split multiply/adds are slow.

One way to address this problem is to utilize a fused multiply/add operation to carry out the operations and have infinite precision. As discussed above, a split multiply/add rounds the intermediate product Rm=Ra*Rc, causing a loss in precision. A fused multiply/add, on the other hand, calculates Ra*Rc+Rb in one instruction. Since there is no intermediate rounding, all the significant digits of the mantissa of Ra*Rc are retained. Because all of the significant digits are retained, there is no loss in precision. For the purposes of this application, when there is no loss in precision, the operation is said to have infinite precision. Because the fused multiply/add operation preserves all of the significant digits the mantissa of Ra*Rc, the fused multiply/add operation has infinite precision.

However, current implementations of the fused multiply/add operation still align the mantissa of Rb to the mantissa of Ra*Rc through a wide shifter. In addition, a fused multiply/add operation normalizes the mantissa of Ra*Rc+Rb through a wide shifter. The use of these two wide shifters significantly slows the calculation of Ra*Rc+Rb in the fused multiply/add.

Accordingly, what is needed is a system and method for maintaining the infinite precision of the fused multiply/add while increasing the speed at which multiply/add operations are performed. The present invention addresses such a need.

SUMMARY OF THE INVENTION

The present invention provides a method and system for an infinite precision split multiply and add operation which has increased speed. The method and system comprise a multiplier means and an adding means. The multiplier means multiplies a first portion of a plurality of operands to provide a product. The adding means combine the product and a remaining portion of the plurality operands. The adding means comprise at least one pair of data paths. Each pair of data paths comprises a first data path and a second data path. The first data path comprises a first aligner, a first adder, and a first normalizer capable of shifting a mantissa by a substantially fewer number digits than the aligner. The second data path comprises a second aligner, a second adder, and a second normalizer capable of shifting a mantissa by a substantially larger number of digits than the aligner.

Accordingly, the present invention includes split multiply and add data paths that are capable of preserving the appearance of infinite precision and which, individually, are faster than a fused multiply and add. Consequently, overall system performance is increased.

DESCRIPTION OF THE INVENTION

The present invention relates to an improvement in the speed at which a multiply/add instruction is carried out. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
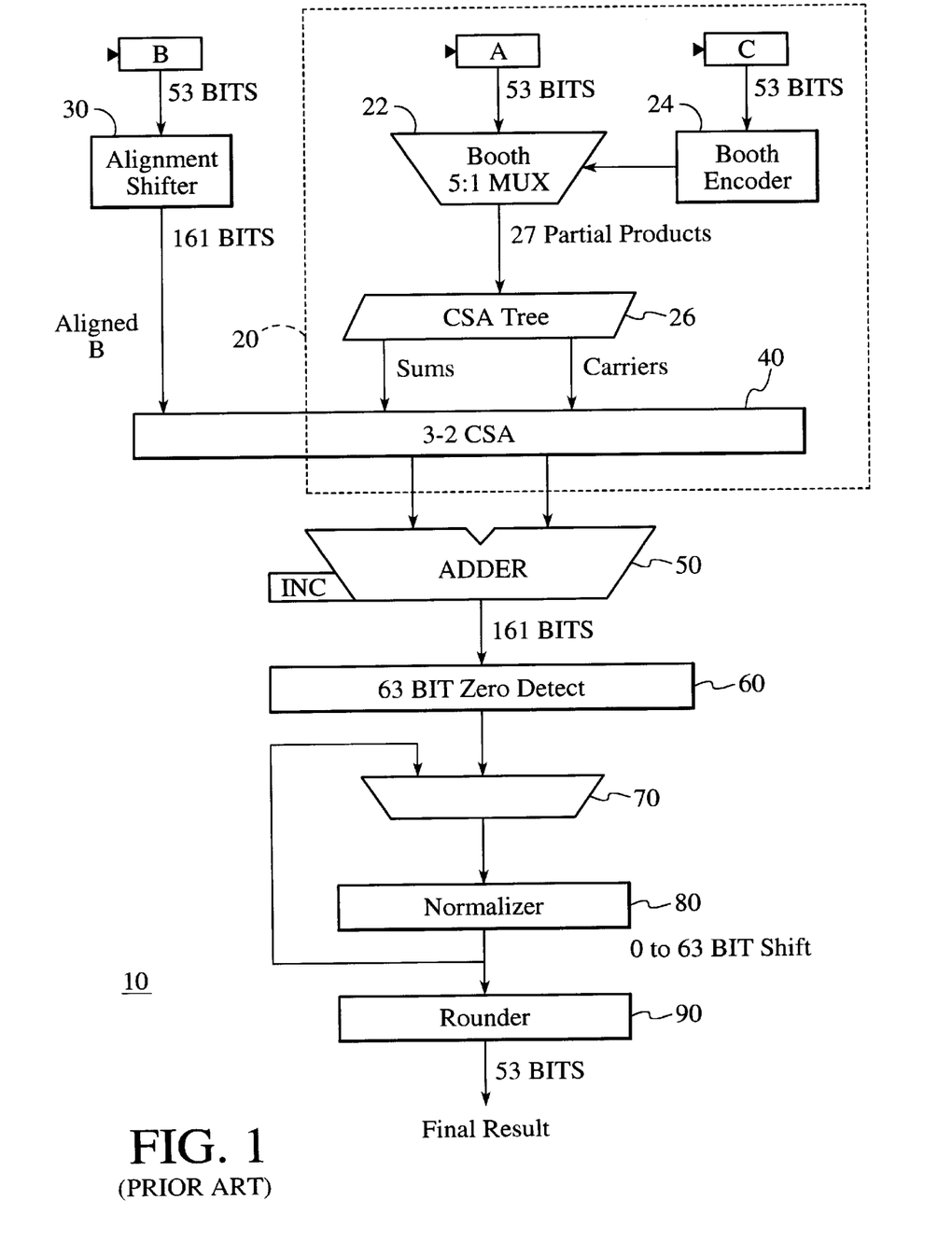
FIG. 1 is a flow chart of a fused multiply/add data flow.

FIG. 1 is a flow chart of how a conventional fused multiply/add operation is performed. Note that in the context of this application, an add is defined to be either an add or a subtract. In this embodiment, it is assumed that the mantissas are each 53 bits wide. FIG. 1 shows the conventional fused multiply add operation 10 having as inputs the mantissas A 21, B 23, and C 25 of operands Ra, Rb, and Rc, respectively. The partial product of (A 21)*(C 25) emerges at the output of Carry Save Adder (CSA) tree 26.

In order to add Rb to Ra*Rc, the exponents must be equalized by aligning the mantissa. Thus, B 23 is shifted at the same time that the exponent of Rb is adjusted to match that of Ra*Rc. At the same time that A 21 and C 25 are routed to the multiplication path 20, B 23 is routed to alignment shifter 30. In a typical embodiment, these operations are performed in parallel to increase the speed of the fused multiply/add. In typical fused multiply/adders, the output of multiplication path 20 is 106 bits wide and B 23 is 53 bits wide. Consequently, to align B 23 to (A 21)*(C 25), alignment shifter 30 is typically a 161 bit shifter. The wider the shifter, the bigger the delay that is added to the data flow. Thus, alignment shifter 30 significantly slows the data flow.

The shifted B 23, and the sums and carries from CSA tree 26 are then input to 3-2 CSA 40. The output of CSA 40 is then input to adder 50, which carries out the operation B 23+(A 21)*(C 25). Adder 50 is 161 bits wide in conventional fused multiply/adders in order to perform addition while preserving all the significant digits of B 23 and (A 21)*(C 25). Because adder 50 is 161 bits wide, it is also slower than a 106 bit wide adder. Leading zeroes in the mantissa of the resultant are detected by leading zero detect 70, and the resultant input to normalizer 80. Normalizer 80 shifts the mantissa of the resultant left to remove any leading zeroes. Normalizer 80 must also be a wide shifter because if B 23 is nearly equal to (A 21)*(C 25), there is a possibility of a large number of leading zeroes. In the present embodiment, for example, normalizer 80 is a 63 bit shifter. Consequently, normalizer 80 also adds a significant delay to the data flow.

Although the fused multiply/add shown in FIG. 1 has infinite precision, those with ordinary skill in the art will realize that alignment shifter 30, normalizer 80, and wide adder 50 contribute significant delays to the data flow.

The delays inherent in conventional fused multiply/adders cannot be remedied by a conventional split multiply/add operation. A conventional split multiply/adder performs the addition operation in a similar way to a conventional fused multiply/adder. Consequently, a split multiply/adder must still align B and A*C, and normalize the resultant B+A*C. A split multiply/adder which has infinite precision will also require a wide alignment shifter, a wide adder and a wide normalizer. Thus, significant delays will also be introduced by a conventional split multiply/add. Thus, what is required is a multiply/add which provides the infinite precision of the fused multiply/adder at a higher data flow rate.

The present invention provides a split multiply/add which has add and multiply data paths which are individually faster than the fused multiply/add. The present invention will be described in terms of a flow chart containing the major elements in the data flow. Thus, some elements which are consistent with conventional approaches will not be described. In addition, the element sizes specified are for the particular embodiment disclosed and should not be construed to limit the method and system. Thus, one of ordinary skill in the art will readily recognize that this method and system will operate effectively for other types and sizes of elements.

Figure 2:
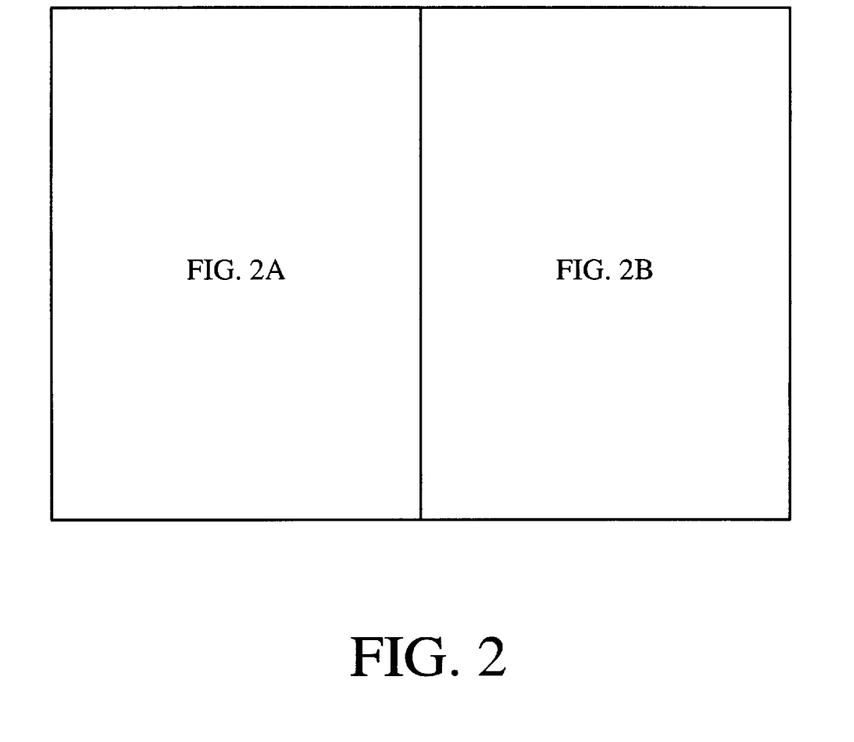
FIG. 2 is a flow chart depicting an embodiment of the faster split multiply/add data flow in accordance with the present invention.
Figure 2A:
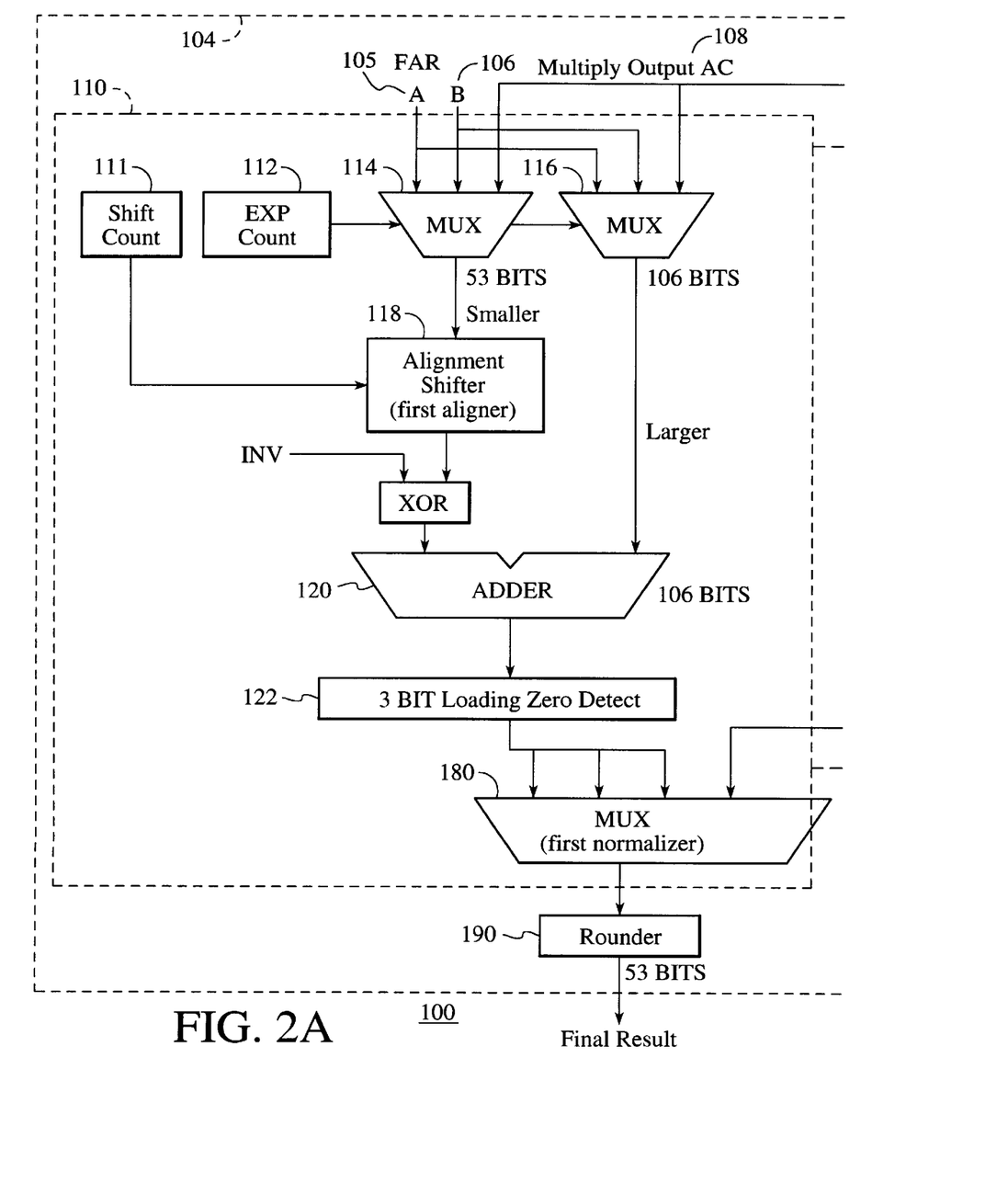
Figure 2B:
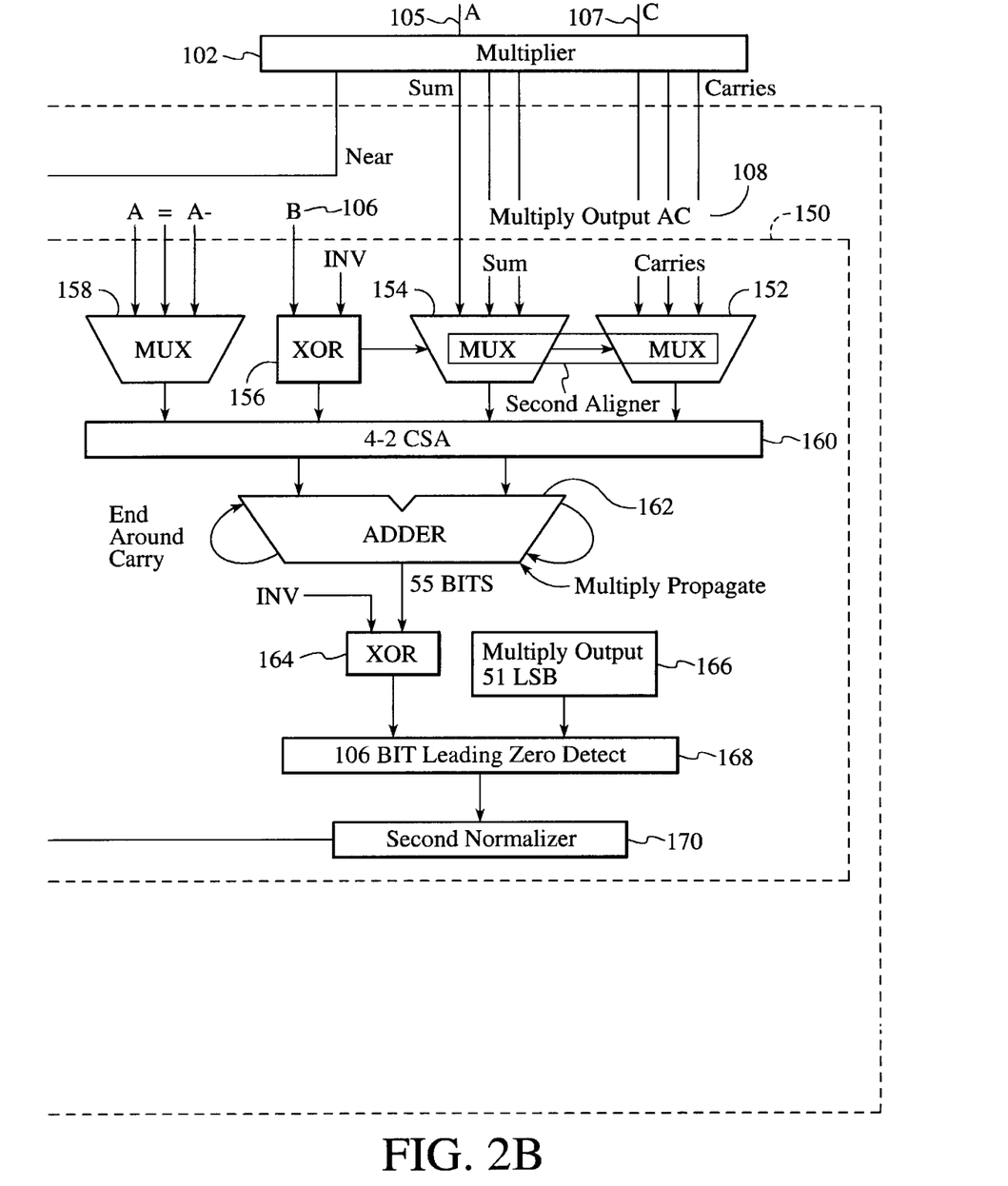

To more particularly illustrate the split multiply/add in accordance with the present invention, refer now to FIG. 2, depicting a flow chart of one embodiment of such a system. The system 100 displayed in FIG. 2 can be used to perform both a split multiply/add operation and a simple add instruction. This embodiment is used for floating point operands with mantissas that are 53 bits wide.

The data flow of add portion 104 of the split multiply/add includes two separate data paths: NEAR data path 150 and FAR data path 110. As with the fused multiply/add, A 105 is the mantissa of Ra, B 106 is the mantissa of Rb, C 107 is the mantissa of Rc, and AC 108 is the mantissa of Ra*Rc. Because A 105 and C 107 are each 53 bits, AC 108 is 106 bits in this embodiment.

In order to perform a simple add instruction, inputs A 105 and B 106 are used. In order to perform a split multiply/add instruction, inputs for B 106 and Multiply Output AC 108 are used. Multiplier 102 provides multiply output AC 108. Although only the split multiply/add will be discussed in detail, the simple add operation can be understood by substituting the input A 105 for the input AC 108 in the discussion below. Note that in this embodiment, only the 53 most significant digits of the final result, after rounding, will be retained.

In the present embodiment, if Rb and Rc are more than 1 digit apart, the resultant from FAR data path 110 is used. Multiplexers (MUXS) 114 and 116, and exponent compare 111 determine whether Rb or Ra*Rc is larger. In this embodiment, the mantissa of the smaller input is aligned to the mantissa of the larger, through a first aligner, alignment shifter 118. Thus, MUX 114 passes the smaller of B 106 and AC 108 to alignment shifter 118. Similarly, MUX 116 passes the larger of B 106 and AC 108 to adder 120.

If Ra*Rc is larger than Rb, then the addition of AC 108 with B 106 can cause a carry from the 53 lower significant bits of AC 108 to the higher 53 significant bits of AC 108. For example, assume that after alignment:

AC 108=M0 M1. M2 M3 M4 . . . M52 M53 M54 . . . M105

B'=0 0. 0 0 0 . . . 0 B1 B2 . . . B52;

where B'=B 106 after alignment to AC 108

When B' is added to AC 108, the resultant of M53+B1+ (carry from lower significant digits) could carry over to be added to M52. Because of this carryover, when AC 108 is larger than B 106, the lower 53 significant digits of AC 108 must be preserved in order to have the appearance of infinite precision in the 53 bit wide final result. Thus, in this embodiment, MUX 116 must be 106 bits wide to be capable of holding all the digits of AC. MUX 114 in this embodiment is 53 bits wide to accommodate B.

When Ra*Rc is smaller than Rb and in the FAR data path, the lower 53 significant digits of AC 108 do not need to be preserved. For example, assume:

B 106=B0. B1 B2 B3 B4 . . . B52

AC'=0, 0 M0 M1 M2 . . . M50 M51 . . . M104 M105

Where AC'=AC 108 aligned to B 106

When Ra*Rc is less than Rb, no carryover can occur from the data below the fifty third digit of AC 108. For the case where Ra*Rc is less then Rb, only 53 bits of the data representing AC 108 must be input at the start of the FAR data flow. Thus, in order to accommodate the cases Ra*Rc greater than Rb and Ra*Rc less than Rb, MUX 114 need only be 53 bits wide. In this embodiment, therefore, MUX 114 is 53 bits wide. In addition, a sticky bit representing the 53 lower significant bits of AC 108 is forwarded. This sticky bit, once ORed into the FAR data path, gives the appearance of infinite precision of smaller operand AC.

Because the smaller of Ra*Rc and Rb is always aligned to the larger, alignment shifter 118 need only shift the smaller mantissa right. Thus, alignment shifter 118 need only be a 106 bit shifter in this embodiment. The shifted smaller mantissa and the unshifted larger mantissa are provided to adder 120. In order to preserve infinite resolution, adder 120 of this embodiment is 106 bits wide. Because Ra*Rc and Rb are greater than 1 digit apart, and AC 108 could have had a leading zero, there can be more than one leading zero in the mantissa of the resultant A*C+B. Thus, in this embodiment, leading zero detect 122 is a 3 bit leading zero detector. MUX 180 comprises a first normalizer which normalizes the resultant of the FAR data path instead of a slower, wide shifter. In this embodiment, alignment shifter 118 is capable of shifting a mantissa by a number of digits that is at least on the order of an operand. MUX 180, however, can shift a mantissa by significantly fewer digits than the width of an operand. MUX 180 is, therefore, capable of shifting a mantissa by substantially fewer digits than alignment shifter 118. In other words, only one wide shifter, alignment shifter 118, is used in the FAR data path. Consequently, the delay in the multiply/add operation is significantly reduced.

Note that a critical timing consideration in the FAR data path involves exponent shift count 111 and exponent compare 112. If the multiply exponent calculation is completed one clock ahead of the multiply mantissa AC, exponent forwarding can be accomplished at the operand input, thereby avoiding an additional delay in FAR data path 110. Thus, the multiply exponent calculation and the multiply mantissa calculation should be synchronized so that the latter finishes one clock after the former.

In the present embodiment, when Ra*Rc and Rb are within 1 digit of each other, the resultant NEAR data path 150 is used. Because Ra*Rc is within 1 digit of Rb, AC 108 is aligned using a second aligner, wherein MUXs 152 and 154 comprise the second aligner. Thus, for this embodiment, MUXs 152 and 154 are 3-1 MUXs. MUXs 152 and 154 have as inputs the sums and carries representing AC 108 shifted left, AC 108 unshifted, AC 108 shifted right. Instead of the final output of the multiply, sums and carries are used to increase the data flow rate. Depending on whether AC 108 is one digit to the right, one digit to the left, or at the same digit as B 106, MUXs 152 and 154 each choose one of its three inputs to align AC 108 to B 106. In this embodiment, MUXs 152, 154, and 158 also produce free zeroes to disable the path not used in the NEAR data flow. The free zeroes are necessary because this embodiment performs both multiply/add operations and simple add operations. The shifted AC 108 and B 106 are input to CSA tree 160 and adder 162. In this embodiment, CSA tree 160 is a 4-2 CSA tree.

When AC 108 is added to B 106 in NEAR data path 150, the 51 lower significant bits of AC 108 will not enter into the add calculation. Consequently, in this embodiment, adder 162 need only be 55 bits wide. The lower significant 51 bits of AC 108 can be represented by a sticky bit. For example, assume:

B 106=B0. B1 . . . B51 B52
AC'=M0 M1. M2 . . . M52 M53 M54 M55 . . . M104 M105 where AC' is AC 108 after alignment
M55 through M105 do not enter into the calculation. Thus, M55 through M105 can be represented by a sticky bit, rather than being directly forwarded into the start of the NEAR data path. However, in this situation, M51–M54 are input at the start of NEAR data path 150.

Where B 106 is subtracted from AC 108 in NEAR data path 150, mass cancellation can occur. Thus, the 51 lower significant bits of AC 108 can become important for infinite precision. For example, assume:

B 106=B0. B1 B2 . . . B51 B52
AC'=M0.M1 M2 . . . M51 M52 M53 M54 . . . M104 M105 where AC' is AC 108 after alignment, and
Bi=Mi, where i=0, 1, 2, 3, . . . 51, 52
The resultant of AC'—B 106=M53 M54 . . . M104 M105. In contrast to addition in NEAR data path 150, the lowest 51 digits of AC 108 can be important in subtraction. Consequently, in this embodiment, the 51 least significant bits of AC 108 are carried into leading zero detect 168 by multiply output 51 LSB 166. As for addition in NEAR data path 150 of the present embodiment, M0 through M54 are input to the start of NEAR data path 150. Because there can be mass cancellation in the NEAR data path, leading zero detect 168 is 106 bits wide in this embodiment.

After undergoing leading zero detect by 106 bit wide leading zero detect 168, the resultant is fully normalized (left shifted) by a second normalizer, normalizer 170. In the present embodiment, normalizer 170 is a 105 bit shifter. Normalizer 170 must be a 105 bit shifter because mass cancellation can occur in NEAR data path 150. Thus, normalizer 170 is capable of shifting a mantissa by a number of digits that is at least on the order of an operand. MUXs 152 and 154, however, can only shift a mantissa by a number of digits that is significantly less than the width of an operand. Thus, normalizer 170 is capable of shifting a mantissa by significantly more digits than MUXs 152 and 154. Consequently, normalizer 170 is the only wide shifter in NEAR data path 150. Therefore, the only significant delay that is introduced into NEAR data path 150 is due to normalizer 170.

NEAR and FAR data paths use common MUX 180 and common rounder 190 in this embodiment. In the present embodiment, therefore, MUX 180 not only normalizes the FAR resultant, but also outputs the NEAR or the FAR resultant depending on how many digits apart Ra*Rc and Rb are. Rounder 180 outputs the 53 bit final result.

NEAR data path 150 and FAR data path 110 each contain only one component capable of shifting a mantissa by a large number of digits. Thus, only one wide shifter is present in each data path In addition, note that for the present embodiment, the adder in each data path is only as wide as necessary to produce the appearance of infinite precision. Adder 162 in NEAR data path 150 is, therefore, only 55 bits wide. Consequently, infinite precision has been preserved while increasing the speed of the calculation of Ra*Rc+Rb.

A method and system has been disclosed for a higher speed, infinite precision split multiply/add. In the add portion of the split multiply/add, the data flow passes through only one wide shifter. In addition, no rounding occurs until after the add operation has been performed. Finally, in the preferred embodiment, the sizes of the elements have been minimized in order to increase the speed of the calculation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for calculating a floating point split multiply and add/subtract of a plurality of operands comprising:

a multiplier means for calculating a product of a first portion of the plurality of operands; and an adding means coupled to the multiplier means, for combining a remaining portion of the plurality of the operands and the product, the adding means further comprising at least one pair of data paths, the at least one pair data paths comprising a first data path and a second data path;

the first data path further comprising:
a first aligner,
a first adder coupled to the first aligner, and
a first normalizer coupled to the first adder, the first normalizer being capable of shifting a mantissa by a substantially fewer number of digits than the first aligner;

the second data path further comprising:
a second aligner,
a second adder coupled to the second aligner, and
a second normalizer coupled to the second adder, the second normalizer being capable of shifting a mantissa by a substantially greater number of digits than the second aligner.

2. The system of claim 1 wherein in each pair of data paths, the first normalizer provides a normalized first resultant; and the second normalizer provides a normalized second resultant;

the system further comprising:

at least one chooser, each chooser being coupled to the first data path and the second data path of a corresponding pair of data paths, each chooser for providing a resultant, the resultant being the normalized first resultant of the corresponding pair of data paths when a pair of inputs to the corresponding pair of data paths are more than a predetermined number of digits apart and the resultant being the normalized second resultant of the corresponding pair of data paths when the pair of inputs to the corresponding pair of data paths are no more than the predetermined number of digits apart;

thereby ensuring that the resultant has the appearance of infinite precision.

3. The system of claim 2 wherein the predetermined number of digits is one digit.

4. The system of claim 2 wherein each chooser further comprises a multiplexer.

5. The system of claim 2 wherein each chooser and each first normalizer of the corresponding pair of data paths comprise a single multiplexer.

6. The system of claim 1 wherein the mantissa of the product is input to the second data path of an associated pair of data paths in the form of a plurality of sums and a plurality of carries.

7. The system of claim 1 wherein each first data path further comprises a comparer coupled to the first aligner, each comparer for comparing a pair of inputs to the first data path and providing the smaller of inputs to the first aligner.

8. The system of claim 1 wherein each first normalizer comprises a multiplexer and each second aligner comprises at least one multiplexer.

9. The system of claim 1 wherein in each pair of data paths, the width of the first adder and the width of the second adder are optimized to increase data flow rates; and wherein a second data path of a pair of data paths which combine the product and one of the remaining operands further comprises:
   a leading zero detector coupled to the second adder and the second normalizer, and
   a multiply output, the multiply output being coupled to the leading zero detector, for forwarding a plurality of the lower significant digits of the mantissa of a the product to the leading zero detector.

10. A system for calculating a floating point split multiply and add/subtract of a first operand, a second operand, and a third operand comprising:

a multiplier means for calculating a product of the first operand and the second operand; and an adding means coupled to the multiplier means, for combining the third operand and the product, the adding means further comprising a first data path and a second data path;

the first data path further comprising:
   a first aligner,
   a first adder coupled to the first aligner, and
   a first normalizer coupled to the first adder, the first normalizer being capable of shifting a mantissa by a substantially fewer number digits than the first aligner;

the second data path further comprising:
   a second aligner,
   a second adder coupled to the second aligner, and
   a second normalizer coupled to the second adder, the second normalizer being capable of shifting a mantissa by a substantially greater number of digits than the second aligner.

11. The system of claim 10 wherein the first normalizer provides a first normalized resultant, and the second normalizer provides a second normalized resultant; the system further comprising:

a chooser for providing a resultant, the chooser being coupled to the second data path and the first data path, the resultant being the normalized first resultant when the product and the third operand are more than a predetermined number of digits apart, and the resultant being the normalized second resultant when the product and the third operand are no more than the predetermined number of digits apart;

thereby ensuring that the resultant has the appearance of infinite precision.

12. The system of claim 11 wherein the predetermined number of digits is one digit.

13. The system of claim 11 wherein the chooser further comprises a multiplexer.

14. The system of claim 11 wherein the chooser and the first normalizer comprise a single multiplexer.

15. The system of claim 11 wherein the mantissa of the product is input to the second data path in the form of a plurality of sums and a plurality of carries.

16. The system of claim 10 wherein the first data path further comprises a comparer coupled to the first aligner, the comparer for comparing the third operand to the product and providing the smaller of the third operand and the product to the first aligner.

17. The system of claim 10 wherein the mantissa of the product is input to the second data path in the form of a plurality of sums and a plurality of carries.

18. The system of claim 10 wherein the first data path further comprises a comparer coupled to the first aligner, the comparer for comparing the third operand to the product and providing the smaller of the third operand and the product to the first aligner.

19. The system of claim 10 wherein the first normalizer comprises a multiplexer and the second aligner comprises at least one multiplexer.

20. The system of claim 10 wherein the width of the first adder and the width of the second adder are optimized to increase data flow rates; and wherein the second data path further comprises:
   a leading zero detector coupled to the second adder and the second normalizer, for detecting leading zeroes in the mantissa of the second resultant; and
   a multiply output coupled to the leading zero detector, for forwarding a plurality of the lower significant digits of the mantissa of the product to the leading zero detector.

21. The system of claim 15 wherein the first normalizer comprises a multiplexer and the second aligner comprises at least one multiplexer.

22. The system of claim 16 wherein the width of the first adder and the width of the second adder are optimized to increase data flow rates; and wherein the second data path further comprises:
   a leading zero detector coupled to the second adder and the second normalizer, for detecting leading zeroes in the mantissa of the second resultant; and
   a multiply output coupled to the leading zero detector, for forwarding a plurality of the lower significant digits of the mantissa of the product to the leading zero detector.

23. A system for calculating a floating point multiply and add/subtract of a first operand, a second operand, and a third operand, and for calculating a floating point add/subtract of the third operand and the first operand comprising:

a multiply for calculating a product of the first operand and the second operand; and adding means coupled to the multiply, for combining the third operand and the product and for combining the third operand and the first operand; the adding means further comprising a first data path and a second data path;

the first data path further comprising:
a first aligner,
a first adder coupled to the first aligner, and
a first normalizer coupled to the first adder, the first normalizer being capable of shifting a mantissa by substantially fewer digits than the first aligner;

the second data path further comprising:
a second aligner,
a second adder coupled to the second aligner, and
a second normalizer coupled to the second adder, the second normalizer being capable of shifting a mantissa substantially more digits than the second aligner;

wherein when the first operand, the second operand and the third operand are input to the system, the system calculates a multiply and add/subtract of the first operand and the second operand and third operand; and wherein when only the first operand and the third operand are input to the system, the system calculates the add/subtract of the first operand and the fourth operand.

24. The system of claim 23 wherein the first normalizer provides a first normalized resultant, and the second normalizer provides a second normalized resultant, the system further comprising:

a chooser coupled to the first data path and the second data path for providing a resultant, the resultant being the normalized first resultant when the product and the third operand or the third operand and the first operand are more than a predetermined number of digits apart, and the resultant being the second resultant when the product and the third operand or the third operand and the first operand are no more than the predetermined number of digits apart, thereby ensuring that the resultant has the appearance of infinite precision.

25. The system of claim 24 wherein the predetermined number of digits of is one digit.

26. The system of claim 23 wherein the product is input to the second data path in the form of a plurality of sums and a plurality of carries.

27. The system of claim 23 wherein the first data path further comprises:

a comparer coupled to the first aligner, for comparing the product to the third operand and providing to the first aligner the smaller of the product and the third operand, and for comparing the third operand to the first operand and providing to the first aligner the smaller of the third operand and the first operand.

28. The system of claim 23 wherein the width of the first adder and the width of the second adder are optimized to increase data flow rates; and wherein the second data path further comprises:

a leading zero detector coupled to the second adder and the second normalizer for detecting leading zeroes in the second resultant; and a multiply output coupled to the leading zero detector for forwarding a plurality of the lower significant digits of the mantissa of the product to the leading zero detector.

29. A method for calculating a floating point multiply and add/subtract of a plurality of operands comprising the steps of:

providing a first portion of the operands to a multiplier means;

multiplying the first portions of the operands to provide a product;

providing the product and a remaining portion of the plurality of operands of a plurality of pairs of data paths;

in each pair of data paths, providing a pair of inputs to a first data path and a second data path;

in the first data path:
providing one input of the pair of inputs to an aligner,
aligning the pair of inputs,
combining the aligned pair of inputs to provide a first resultant,
detecting any leading zeros of the first resultant,
providing the first resultant to a first normalizer capable of shifting a mantissa by a substantially smaller number of digits than the first normalizer, and
normalizing the first resultant by shifting the mantissa of the first resultant left, thereby providing a normalized first resultant;

in the second data path:
providing one input of the pair of inputs to a second aligner,
aligning the pair of inputs,
combining the aligned pair of inputs to provide a second resultant,
detecting any leading zeroes of the second resultant,
providing the second resultant to a second normalizer capable of shifting a mantissa a substantially greater number of digits than the second aligner, and
normalizing the second resultant to remove any leading zeroes by shifting the second resultant left, thereby providing a normalized second resultant.

30. The method of claim 29 wherein in the first data path, the step of providing one input of the pair of inputs to the first aligner comprises the steps of:

providing the pair of inputs to a comparer,
comparing the pair of inputs to determine which input is smaller, and
providing the smaller of the pair of inputs to a first aligner; and the step of aligning the pair of inputs comprises the steps of:
aligning the smaller of the pair of inputs to the larger of the pair of inputs by equalizing the exponents of the pair of inputs, and
shifting the mantissa of the smaller of pair of inputs right.

31. The method of claim 30 further comprising the additional steps of:

providing the normalized first resultant and the normalized second resultant to a chooser;
choosing the normalized first resultant as a resultant if the pair of inputs are more than a predetermined number of digits apart and choosing the normalized second resultant as the resultant if the pair of inputs are less than the predetermined number of digits apart,
thereby ensuring that the resultant has the appearance of infinite precision.

32. The method of claim 29 further comprising the additional steps of:

providing the normalized first resultant and the normalized second resultant to a chooser;
choosing the normalized first resultant as a resultant if the pair of inputs are more than a predetermined number of digits apart and choosing the normalized second resultant as the resultant if the pair of inputs are less than the predetermined number of digits apart, thereby ensuring that the resultant has the appearance of infinite precision.

33. A method for calculating a floating point split multiply and add/subtract of a first operand, a second operand, and a third operand comprising the steps of:

providing the first operand and the second operand to a multiplier means;

multiplying the first operand and the second operand to provide a product;

providing the product and the third operand to a first data path and a second data path;

in the first data path:
providing the product to a first aligner,
aligning the product and the third operand,
combining the aligned product and third operand to provide a first resultant,
detecting any leading zeros of the first resultant,
providing the first resultant to a first normalizer capable of shifting a mantissa by a substantially smaller number digits than the first aligner, and
normalizing the first resultant by removing any leading zeroes by shifting the first resultant left, thereby providing a normalized first resultant, in the second data path:
providing the product and the third operand to an aligner,
aligning the product and the third operand,
combining the aligned product and third operand to provide a second resultant,
detecting any leading zeroes of the second resultant,
providing the second resultant to a second normalizer capable of shifting a mantissa by a substantially greater number of digits than the second aligner, and
normalizing the second resultant to remove any leading zeroes by shifting the second resultant left, thereby providing a normalized second resultant.

34. The method of claim 33 wherein the step of aligning the product and the third operand in the first data path comprises equalizing the exponents and shifting the mantissa of the product right or left.

35. The method of claim 33 wherein the step of aligning the product and the third operand in the first data path comprises equalizing the exponents and shifting the mantissa of the third operand right or left.

36. The method of claim 33 wherein the step of aligning the product and the third operand in the second data path comprises equalizing the exponents and shifting the mantissa of the product right or left.

37. The method of claim 33 further comprising the additional steps of:

providing the normalized first resultant and the normalized second resultant to a chooser;

choosing the normalized first resultant as a resultant if the product and the third operand are more than a predetermined number of digits apart and choosing the normalized second resultant as the resultant if the product and the third operand are less than the predetermined number of digits apart, thereby ensuring that the resultant has the appearance of infinite precision.

38. The method of claim 33 wherein the step of providing the product to the second data path further comprises providing the sums and carries representing the mantissa of the product to the second data path.

39. A method for calculating a floating point split multiply and add/subtract of a first operand, a second operand, and a third operand comprising the steps of:

providing the first operand and the second operand to a multiplier means;

multiplying the first operand and the second operand to provide a product;

providing the product and the third operand to a first data path and a second data path;

in the first data path:
comparing the product and the third operand to determine which is smaller;
providing the smaller of the product and the third operand to a first aligner,
aligning the smaller of the product and the third operand to the larger by equalizing the exponents and shifting the mantissa of the smaller of the product and the third operand right, thereby providing an aligned smaller operand,
combining the aligned smaller of the product and the third operand with the larger of the product and the third operand to provide a first resultant,
detecting any leading zeros of the first resultant,
providing the first resultant to a first normalizer capable of shifting a mantissa by a substantially smaller number digits than the first aligner, and
normalizing the first resultant to remove any leading zeroes by shifting the mantissa of the first resultant left, thereby providing a normalized first resultant;

in the second data path:
providing the product and the third operand to an aligner,
aligning the product to the third operand by shifting the mantissa of the product right or left, thereby providing an aligned product,
combining the aligned product and the third operand to provide a second resultant,
detecting any leading zeroes of the second resultant,
providing the second resultant to a second normalizer capable of shifting a mantissa a substantially greater number of digits than the second aligner, and
normalizing the second resultant to remove any leading zeroes by shifting the second resultant left, thereby providing a normalized second resultant.

40. The method of claim 39 further comprising the additional steps of:

providing the normalized first resultant and the normalized second resultant to a chooser;

choosing the normalized first resultant as a resultant if the product and the third operand are more than a predetermined number of digits apart and choosing the normalized second resultant as the resultant if the product and the third operand are less than the predetermined number of digits apart, thereby ensuring that the resultant has the appearance of infinite precision.

41. The method of claim 39 wherein the step of providing the product to the second data path further comprises providing the sums and carries representing the mantissa of the product to the second data path.

42. A method for calculating a floating point split multiply and add/subtract of a first operand, a second operand, and a third operand, and for calculating a floating point add/subtract of the third operand and the first operand comprising the following steps of:

when the first operand, the second operand and the third operand are input:

providing the first operand and the second operand to a multiplier means;

multiplying the first operand and the second operand to provide a product;

providing the product and the third operand to a first data path and a second data path;

in the first data path:
   comparing the product and the third operand to determine which is smaller;
   providing the smaller of the product and the third operand to a first aligner,
   aligning the smaller of the product and the third operand to the larger by equalizing the exponents and shifting the mantissa of the smaller of the product and the third operand right, thereby providing an aligned smaller operand,
   combining the aligned smaller of the product and the third operand with the larger of the product and the third operand to provide a first resultant,
   detecting any leading zeros of the first resultant,
   providing the first resultant to a first normalizer capable of shifting a mantissa by a substantially smaller number digits than the first aligner, and
   normalizing the first resultant to remove any leading zeroes by shifting the mantissa of the first resultant left, thereby providing a normalized first in the second data path:
   providing the product and the third operand to an aligner,
   aligning the product to the third operand by shifting the mantissa of the product right or left, thereby providing an aligned product,
   combining the aligned product and the third operand to provide a second resultant,
   detecting any leading zeroes of the second resultant,
   providing the second resultant to a second normalizer capable of shifting a mantissa a substantially greater number of digits than the second aligner, and
   normalizing the second resultant to remove any leading zeroes by shifting the second resultant left, thereby providing a normalized second resultant;

when only the first operand and the third operand are input:
   providing the first operand and the third operand to a first data path and a second data path;

in the first data path:
   comparing the first operand and the third operand to determine which is smaller;
   providing the smaller of the first operand and the third operand to a first aligner,
   aligning the smaller of the first operand and the third operand to the larger by equalizing the exponents and shifting the mantissa of the smaller of the first operand and the third operand right, thereby providing an aligned smaller operand,
   combining the aligned smaller of the first operand and the third operand with the larger of the first operand and the third operand to provide a first resultant,
   detecting any leading zeros of the first resultant,
   providing the first resultant to a first normalizer capable of shifting a mantissa by a substantially smaller number digits than the first aligner, and
   normalizing the first resultant to remove any leading zeroes by shifting the mantissa of the first resultant left, thereby providing a normalized first resultant;

in the second data path:
   providing the first operand and the third operand to an aligner,
   aligning the first operand to the third operand by shifting the mantissa of the first operand right or left, thereby providing an aligned first operand,
   providing free zeroes to disable any portion of the aligner not used,
   combining the aligned first operand and the third operand to provide a second resultant,
   detecting any leading zeroes of the second resultant,
   providing the second resultant to a second normalizer capable of shifting a mantissa a substantially greater number of digits than the second aligner, and normalizing the second resultant to remove any leading zeroes by shifting the second resultant left, thereby providing a normalized second resultant.

\* \* \* \* \*